US012562600B2

(12) United States Patent
Stingu et al.

(10) Patent No.: US 12,562,600 B2
(45) Date of Patent: Feb. 24, 2026

(54) FOREIGN OBJECT DETECTION TESTING FOR WIRELESS CHARGERS

(71) Applicant: Spark Connected LLC, Dallas, TX (US)

(72) Inventors: Petru Emanuel Stingu, Dallas, TX (US); Arun Raghu, Dallas, TX (US); Malek Ramezani, Lynnwood, WA (US); Kenneth Moore, Dallas, TX (US); Ruwanga Dassanayake, Dallas, TX (US)

( * ) Notice: Subject to any disclaimer, the term of this patent is extended or adjusted under 35 U.S.C. 154(b) by 783 days.

(21) Appl. No.: 17/868,196

(22) Filed: Jul. 19, 2022

(65) Prior Publication Data

US 2023/0025719 A1 Jan. 26, 2023

Related U.S. Application Data

(60) Provisional application No. 63/223,776, filed on Jul. 20, 2021.

(51) Int. Cl.
H02J 50/60 (2016.01)
H02J 7/00 (2006.01)
(Continued)

(52) U.S. Cl.
CPC ........ H02J 50/60 (2016.02); H02J 7/007192 (2020.01); H04B 5/79 (2024.01); H02J 50/12 (2016.02)

(58) Field of Classification Search
CPC ...... H02J 50/60; H02J 7/007192; H02J 50/12; H04B 5/79
See application file for complete search history.

(56) References Cited

U.S. PATENT DOCUMENTS

| | | | |
|---|---|---|---|
| 3,376,578 A | 4/1968 | Sawyer | |
| 3,735,231 A | 5/1973 | Sawyer | |

(Continued)

FOREIGN PATENT DOCUMENTS

JP 2002009566 A 1/2022

OTHER PUBLICATIONS

Alqatamin, M. et al., "Current Control of a Three-Phase, Grid-Connected Inverter in the Presence of Unknown Grid Parameters without a Phase Locked Loop," IEEE Journal of Emerging and Selected Topics in Power Electronics, Jun. 25, 2020, 10 pages.

(Continued)

*Primary Examiner* — Farhana A Hoque
*Assistant Examiner* — Joseph O Nyamogo

(57) ABSTRACT

In an embodiment, a method for performing foreign object detection (FOD) testing of a wireless power transmitter includes: placing a foreign object (FO) between the wireless power transmitter and a wireless power receiver; beginning to wirelessly transmitting power from the wireless power transmitter towards the wireless power receiver; a predetermined amount of time after beginning to wirelessly transmit power, measuring an FO temperature indicative of a temperature of the FO, a transmitter temperature indicative of a temperature of the wireless power transmitter, and a receiver temperature indicative of a temperature of the wireless power receiver; determining a weighted average temperature based on the measured transmitter temperature and the measured receiver temperature; and when a difference between the measured FO temperature and the weighted average temperature is higher than a threshold temperature, asserting an error flag indicative that the FOD test failed.

22 Claims, 11 Drawing Sheets

(51) Int. Cl.
    *H02J 50/12*     (2016.01)
    *H04B 5/79*     (2024.01)

(56)         References Cited

U.S. PATENT DOCUMENTS

| | | | |
|---|---|---|---|
| 4,860,183 | A | 8/1989 | Maeda et al. |
| 5,051,875 | A | 9/1991 | Johnson |
| 5,434,504 | A | 7/1995 | Hollis et al. |
| 5,498,948 | A | 3/1996 | Bruni et al. |
| 6,175,169 | B1 | 1/2001 | Hollis, Jr. et al. |
| 6,184,628 | B1 | 2/2001 | Ruthenberg |
| 6,184,651 | B1 | 2/2001 | Fernandez et al. |
| 6,445,093 | B1 | 9/2002 | Binnard |
| 6,803,744 | B1 | 10/2004 | Sabo |
| 6,949,845 | B2 | 9/2005 | Oisugi et al. |
| 7,244,037 | B2 | 7/2007 | Koren |
| 8,049,370 | B2 | 11/2011 | Azancot et al. |
| 8,193,769 | B2 | 6/2012 | Azancot et al. |
| 8,957,549 | B2 | 2/2015 | Kesler et al. |
| 9,247,595 | B2 | 1/2016 | Fornage et al. |
| 9,590,444 | B2 | 3/2017 | Walley et al. |
| 9,800,191 | B2 | 10/2017 | Barsilai et al. |
| 9,853,441 | B2 | 12/2017 | Teggatz et al. |
| 9,929,604 | B2 * | 3/2018 | Watanabe .............. H02J 50/12 |
| 10,054,622 | B2 | 8/2018 | Hernandez et al. |
| 10,079,090 | B2 | 9/2018 | Teggatz et al. |
| 10,168,443 | B2 | 1/2019 | Mangano et al. |
| 10,473,273 | B1 | 11/2019 | Zolotykh et al. |
| 10,714,976 | B2 | 7/2020 | Uchimoto |
| 10,983,153 | B1 | 4/2021 | Forood et al. |
| 11,199,715 | B2 | 12/2021 | Van Heugten |
| 2006/0061323 | A1 | 3/2006 | Cheng et al. |
| 2009/0079387 | A1 | 3/2009 | Jin et al. |
| 2009/0127937 | A1 | 5/2009 | Widmer |
| 2009/0153098 | A1 | 6/2009 | Toya et al. |
| 2010/0033290 | A1 | 2/2010 | Liu et al. |
| 2010/0171369 | A1 | 7/2010 | Baarman et al. |
| 2010/0181841 | A1 | 7/2010 | Azancot et al. |
| 2010/0219183 | A1 | 9/2010 | Azancot et al. |
| 2010/0244579 | A1 | 9/2010 | Sogabe et al. |
| 2011/0050164 | A1 | 3/2011 | Partovi et al. |
| 2011/0062793 | A1 | 3/2011 | Azancot et al. |
| 2011/0074344 | A1 | 3/2011 | Park et al. |
| 2011/0121660 | A1 | 5/2011 | Azancot et al. |
| 2011/0227527 | A1 | 9/2011 | Zhu et al. |
| 2012/0032632 | A1 | 2/2012 | Soar |
| 2012/0112532 | A1 | 5/2012 | Kesler et al. |
| 2012/0235636 | A1 | 9/2012 | Partovi |
| 2013/0049484 | A1 | 2/2013 | Weissentern et al. |
| 2013/0082651 | A1 | 4/2013 | Park et al. |
| 2013/0257168 | A1 | 10/2013 | Singh |
| 2013/0257172 | A1 | 10/2013 | Teggatz et al. |
| 2013/0260676 | A1 | 10/2013 | Singh |
| 2013/0264973 | A1 | 10/2013 | Garg et al. |
| 2013/0285601 | A1 | 10/2013 | Sookprasong et al. |
| 2013/0300204 | A1 | 11/2013 | Partovi |
| 2014/0015329 | A1 | 1/2014 | Widmer et al. |
| 2014/0020312 | A1 | 1/2014 | Seiling et al. |
| 2014/0080409 | A1 | 3/2014 | Frankland et al. |
| 2014/0103869 | A1 | 4/2014 | Radovic et al. |
| 2014/0119082 | A1 | 5/2014 | Mueck et al. |
| 2014/0159501 | A1 | 6/2014 | Kanno et al. |
| 2014/0184150 | A1 | 7/2014 | Walley |
| 2014/0191568 | A1 | 7/2014 | Partovi |
| 2015/0054454 | A1 | 2/2015 | White, II et al. |
| 2015/0115877 | A1 | 4/2015 | Arai et al. |
| 2015/0142348 | A1 | 5/2015 | Huang et al. |
| 2015/0171633 | A1 * | 6/2015 | Nakano .................... H04B 5/26 |
| | | | 307/104 |
| 2015/0233987 | A1 | 8/2015 | Von Novak, III et al. |
| 2015/0249484 | A1 | 9/2015 | Mach et al. |
| 2015/0333797 | A1 | 11/2015 | Nejatali et al. |
| 2015/0341087 | A1 | 11/2015 | Moore et al. |
| 2015/0349542 | A1 | 12/2015 | Yamamoto et al. |
| 2015/0364944 | A1 | 12/2015 | Garcia Briz et al. |
| 2016/0094048 | A1 | 3/2016 | Bae |
| 2016/0094051 | A1 | 3/2016 | Soar |
| 2016/0118806 | A1 | 4/2016 | Standke et al. |
| 2016/0149440 | A1 | 5/2016 | Staring et al. |
| 2016/0161288 | A1 | 6/2016 | Lu |
| 2016/0172891 | A1 | 6/2016 | Filippenko et al. |
| 2016/0190852 | A1 | 6/2016 | Chiang et al. |
| 2016/0226296 | A1 | 8/2016 | Bae et al. |
| 2016/0336804 | A1 | 11/2016 | Son et al. |
| 2016/0336809 | A1 | 11/2016 | Gluzman et al. |
| 2017/0033591 | A1 | 2/2017 | Govindaraj et al. |
| 2017/0040843 | A1 | 2/2017 | Asanuma et al. |
| 2017/0077837 | A1 | 3/2017 | Gu et al. |
| 2017/0163100 | A1 | 6/2017 | Vocke et al. |
| 2017/0250578 | A1 | 8/2017 | Kallman |
| 2017/0274788 | A1 | 9/2017 | Zhang et al. |
| 2017/0279306 | A1 | 9/2017 | Elad et al. |
| 2017/0294798 | A1 | 10/2017 | Yuk et al. |
| 2017/0310166 | A1 | 10/2017 | Huang et al. |
| 2017/0346348 | A1 | 11/2017 | Lethellier et al. |
| 2018/0014709 | A1 | 1/2018 | O'Brien et al. |
| 2018/0115197 | A1 | 4/2018 | Li et al. |
| 2018/0131218 | A1 | 5/2018 | Shellhammer et al. |
| 2018/0166881 | A1 | 6/2018 | Suryanarayana et al. |
| 2018/0219428 | A1 | 8/2018 | Bae |
| 2018/0226938 | A1 | 8/2018 | Kuisma |
| 2018/0262065 | A1 | 9/2018 | Weidner |
| 2018/0272130 | A1 | 9/2018 | Meskens et al. |
| 2018/0301942 | A1 | 10/2018 | Brohlin et al. |
| 2018/0342907 | A1 | 11/2018 | Dimke et al. |
| 2019/0045676 | A1 | 2/2019 | Lee et al. |
| 2019/0068001 | A1 | 2/2019 | Lovas et al. |
| 2019/0097448 | A1 | 3/2019 | Partovi |
| 2019/0109498 | A1 | 4/2019 | Stingu et al. |
| 2019/0190320 | A1 | 6/2019 | Park |
| 2019/0214842 | A1 | 7/2019 | Wheeland et al. |
| 2019/0275904 | A1 * | 9/2019 | Matsuo .................... B60M 7/00 |
| 2019/0296590 | A1 | 9/2019 | Chae |
| 2019/0319494 | A1 | 10/2019 | Park et al. |
| 2019/0329653 | A1 | 10/2019 | Ueta |
| 2019/0334388 | A1 | 10/2019 | Van Wageningen et al. |
| 2019/0363584 | A1 | 11/2019 | Leem |
| 2019/0366858 | A1 * | 12/2019 | Franz ...................... H02J 50/10 |
| 2020/0259369 | A1 | 8/2020 | Stingu et al. |
| 2020/0313471 | A1 | 10/2020 | Stingu et al. |
| 2021/0257862 | A1 * | 8/2021 | Muratov ................. H02J 50/60 |
| 2022/0094208 | A1 * | 3/2022 | Muratov ................. H02J 50/60 |

OTHER PUBLICATIONS

Bartsch, A., "The Intelligent Mouthguard: A Valid Tool to Meet Demand for Accurate, Precise Head Impact Data," Consult QD, Neurosciences, Advancing Patient Care, Nov. 10, 2015, 6 pages.

Consumer Reports, "Wireless Charging Pad Review," https://www.consumerreports.org/cro/news/2013/10/wireless charging-pad-reviews/index.htm, Dec. 11, 2013, 5 pages.

Digi-Key Electronics, "Inductive Versus Resonant Wireless Charging: A Truce May Be a Designer's Best Choice," Aug. 2, 2016, 8 pages.

Gao, X., "Demodulating Communication Signals of Qi-Compliant Low-Power Wireless Charger Using MC56F8006 DSC," Freescale Semiconductor, Application Note, AN4701, Mar. 2013, 21 pages.

Gati, E. et al., "Wireless Phase-Locked Loop Control for Inductive Power Transfer Systems," IEEE, May 11, 2015, 7 pages.

Hayward Pool Products, "160 & 320 ColorLogic and CrystaLogic 1.5" LED Lights—LED Light Fixtures, Owner's Manual, RevF 092532, Hayward Pool Products, 2019, 28 pages.

Jansen, J. W., "Overview of Analytical Models for the Design of Linear and Planar Motors," IEEE Transactions on Magnetics, vol. 50, No. 11, Nov. 2014, 8 pages.

Johns, B. et al., "Adapting Qi-Compliant Wireless-Power Solutions to Low-Power Wearable Products," Texas Instruments, Power Management, Analog Applications Journal, Jun. 9, 2014, 7 pages.

Lynch, Brian T., "Under the Hood of a DC/DC Boost Converter", Texas Instruments, Power Supply Design Seminar, Paper SEM1800, Dallas, TX, USA, 2008-2009, 26 pages.

(56) References Cited

OTHER PUBLICATIONS

On Semiconductor, "90W Type-C PD3.0 / QC4.0 Power Adapter Solution with WT6636F," DN05125/D, May 2020, 24 pages.

On Semiconductor, "Secondary Side Synchronous Rectification Driver for High Efficiency SMPS Topologies," NCP4306, Mar. 2020, 52 pages.

Qi Wireless Power Consortium, "The Qi Wireless Power Transfer System Power Class 0 Specification Part 4: Reference Designs", Version 1.2.3., Feb. 2017, 336 pages.

Qi Wireless Power Consortium, "The Qi Wireless Power Transfer System Power Class 0 Specification Parts 1 and 2: Interface Definitions", Version 1.2.3., Feb. 2017, 165 pages.

Pentair, "Intellibrite 5G White and Color Pool and Spa Lights", www.pentair.com, Installation and User's Guide, 2019, 97 pages.

Power Electronics, "Qi-Compatible Wireless Charging A11 Type Tx Coil for 5V Applications," Sep. 27, 2016, 11 pages.

Rice, J., "Examining Wireless Power Transfer," Texas Instruments, 2014/15 Power Supply Design Seminar, 2015, 38 pages.

Skjellnes, A. et al., "Phase-locked loop control of thyristor converters," Proc. IEE, vol. 123, No. 10, Oct. 1976, 3 pages.

So, A., "This Smart Mouthguard Can Monitor Concussions," Wired, https://www.wired.com/story/this-smart-mouthguard-can-monitor-concussions/, Mar. 1, 2018, 7 pages.

Texas Instruments "Industry-Leading Wireless Power Solutions—The Most Widely Adopted in the Market", ti.com/wirelesspower, SLYT485C, 2013, 3 pages.

Texas Instruments, "Introduction to Wireless Power", QI WPC 1.1 compliant, 2016, 49 pages.

Texas Instruments, "LC Sensor Rotation Detection With MSP430 Extended Scan Interface (ESI)," Application Report, SLAA639, Jul. 2014, 33 pages.

Waters, B. et al., "Optimal Coil Size Ratios for Wireless Power Transfer Applications," IEEE, Jul. 28, 2014, 4 pages.

Wikipedia, "Electromagnetic coil", https://en.wikipedia.org/w/index.php?title=Electromagnetic_coil&oldid=776415501, Apr. 20, 2017, 6 pages.

Wikipedia, "Inductive charging", https://en.wikipedia.org/w/index.php?title=Inductive_charging&oldid=802615270, Sep. 27, 2017, 7 pages.

Wikipedia, "Qi (standard)", https://en.wikipedia.org/w/index.php?title=Qi_(standard)&oldid=803427516, Oct. 2, 2017, 5 pages.

Wikipedia, "Phase-locked loop," https://en.wikipedia.org/wiki/Phase-locked_loop, Sep. 22, 2020, 17 pages.

Wireless Power Consortium, "Introduction to the Power Class 0 Specification," Version 1.2.3, Feb. 2017, 16 pages.

Zens, "Zens First Worldwide to Introduce Built-In Wireless (Sub-)Surface Charger with Apple and Samsung Fast Charge," https://www.makezens.com/article/zens-first-worldwide-introduce-built-wireless-sub-surface-charger-apple-samsung-fast-charge/, Mar. 23, 2018, 5 pages.

* cited by examiner

Prior Art

FO Temperature at different thermal resistance between TX-FO and RX-FO at 10th minute ($P_{FO}$=0.5W)

FO Temperature at different thermal resistance between TX-FO and RX-FO at 10th minute ($P_{FO}$=0)

FO Temperature at different thermal resistance between TX-FO and RX-FO at 1 hour ($P_{FO} \approx 0.5W$)

FO Temperature at different thermal resistance between TX-FO and RX-FO at 1 hour ($P_{FO} = 0$)

700 ⟍

702

Place an FO between a transmitter and a receiver

704

Begin wireless power transmission between the transmitter and the receiver

706

After a predetermined amount of time, measure $T_{FO}$, $T_{TX}$, $T_{RX}$, and $T_{room}$

708

$T_{FO} - T_{AVG} > T_{thres}$?

yes → FO dissipating more than predetermined power (fail)

no

FO dissipating less than predetermined power (pass)

FOREIGN OBJECT DETECTION TESTING FOR WIRELESS CHARGERS

CROSS-REFERENCE TO RELATED APPLICATIONS

This application claims the benefit of U.S. Provisional Application No. 63/223,776, entitled "Foreign Object Detection Testing for Wireless Chargers," and filed on Jul. 20, 2021, which application is hereby incorporated herein by reference.

TECHNICAL FIELD

The present disclosure relates generally to an electronic system and method, and, in particular embodiments, to foreign object detection (FOD) testing for wireless chargers.

BACKGROUND

Wireless charging systems are becoming ubiquitous in today's society. For example, many smartphones and wearables implement wireless charging technology. Ease of use, greater reliability, spatial freedom, reduced connectors and openings, and the possibility of hermetically sealing are among the benefits offered by wireless charging. Wireless charging standards allow for interoperability between different devices and manufacturers. Some wireless charging standards, such as the Qi standard from the Wireless Power Consortium, and standards promoted by the AirFuel alliance, are becoming widely adopted. The Qi standard uses inductive charging operating between 80 kHz and 400 kHz to wirelessly transmit power from a transmitter to a receiver. Standards promoted by the AirFuel alliance use resonant wireless charging operating at 6.78 MHz to wirelessly transmit power from a transmitter to a receiver.

FIG. 1 shows a schematic diagram of exemplary wireless charging system 100.

Wireless charging system 100 includes a transmitter (TX) device 102 that includes a transmitting coil $L_{TX}$, and a receiver (RX) device 104 that includes a receiving coil $L_{RX}$. The efficiency of the wireless power transmission generally depends on the coupling between the coil $L_{TX}$ and coil $L_{RX}$. The coupling between the transmitting coil $L_{TX}$ and the receiving coil $L_{RX}$ is generally based on the relative position between the transmitting coil $L_{TX}$ and the receiving coil $L_{RX}$.

As shown in FIG. 1, during wireless charging, a wireless charger transmitter (e.g., 102) transmits wireless power to a wireless power receiver (e.g., 104). It is often desirable to detect foreign objects (FOs), such as metallic foreign objects. For example, metallic objects exposed to the magnetic field generated by a wireless power transmitter may heat-up, thus producing a safety hazard, loss in wireless power transfer efficiency, and/or other effects. Thus, if the foreign object is detected, a wireless power transmitter may stop transmitting wireless power or reduce the power level of the wireless power transmitted.

A wireless power transmitter (e.g., 102) may perform foreign object detection (FOD). For example, FOD may be performed by calculating the power dissipated during wireless power transmission, and determining whether a foreign object is present if the dissipated power (e.g., the difference between the power transmitted ($P_{TX}$) by the wireless power transmitter 102 and the power received ($P_{RX}$) by the wireless power receiver 104) is larger than a threshold (e.g., 10% of transmitter power level).

It may be desirable to test whether the FOD performed, e.g., by transmitted 102, is working properly. For example, the Qi standard implicitly requires that FOs should not dissipate more than between 0.4 W and 0.7 W. The purpose of the FOD tests in the Qi specification is to verify that the amount of power dissipated into foreign objects is limited to a small value (around 500 mW).

Some of the existing FOD tests use FO temperature as an indirect measurement of the dissipated power into the FO. For example, a conventional way to perform FOD testing is to intentionally introduce a FO between the transmitter 102 and the receiver 104, and measure the absolute temperature of the FO after a predetermined time (e.g., 1 hour). If the absolute temperature increases by more than a predetermined amount (e.g., 60° C.), then the FOD is working properly. Otherwise, the FOD is not working properly and is allowing the FO to dissipate more than a prescribed amount of power (e.g., 0.5 W).

SUMMARY

In accordance with an embodiment, a method for performing foreign object detection (FOD) testing of a wireless power transmitter includes: placing a foreign object (FO) between the wireless power transmitter and a wireless power receiver; beginning to wirelessly transmitting power from the wireless power transmitter towards the wireless power receiver; a predetermined amount of time after beginning to wirelessly transmit power, measuring an FO temperature indicative of a temperature of the FO, a transmitter temperature indicative of a temperature of the wireless power transmitter, and a receiver temperature indicative of a temperature of the wireless power receiver; determining a weighted average temperature based on the measured transmitter temperature and the measured receiver temperature; and when a difference between the measured FO temperature and the weighted average temperature is higher than a threshold temperature, asserting an error flag indicative that the FOD test failed.

In accordance with an embodiment, a system for performing foreign object detection (FOD) testing of a wireless power transmitter includes: a wireless power receiver; a foreign object (FO) device including an FO; and a processor configured to, receive an FO temperature indicative of a temperature of the FO, a transmitter temperature indicative of a temperature of the wireless power transmitter, and a receiver temperature indicative of a temperature of the wireless power receiver, determine a weighted average temperature based on the received transmitter temperature and the received receiver temperature, and when a difference between the received FO temperature and the weighted average temperature is higher than a threshold, asserting an error flag indicative that the FOD test failed.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

It is understood that the term wireless charging is not limited to the charging of a battery, but includes wireless power transmission generally, unless stated otherwise.

Embodiments of the present invention will be described in specific contexts, e.g., an FOD testing method and system for wireless chargers implementing the Qi standard. Embodiments of the present invention may be used in wireless chargers not implementing the Qi standard.

In an embodiment of the present invention, the FOD performance of a wireless power transmitter is tested based on the difference between a temperature of an FO and a weighted average temperature of the system used to perform the test. By using the difference in temperature instead of the absolute temperature of the FO, some embodiments advantageously achieve faster and more accurate results, which may be used, e.g., to ensure compatibility to a particular standard (e.g., such as the Qi standard).

Figures 8, 9:
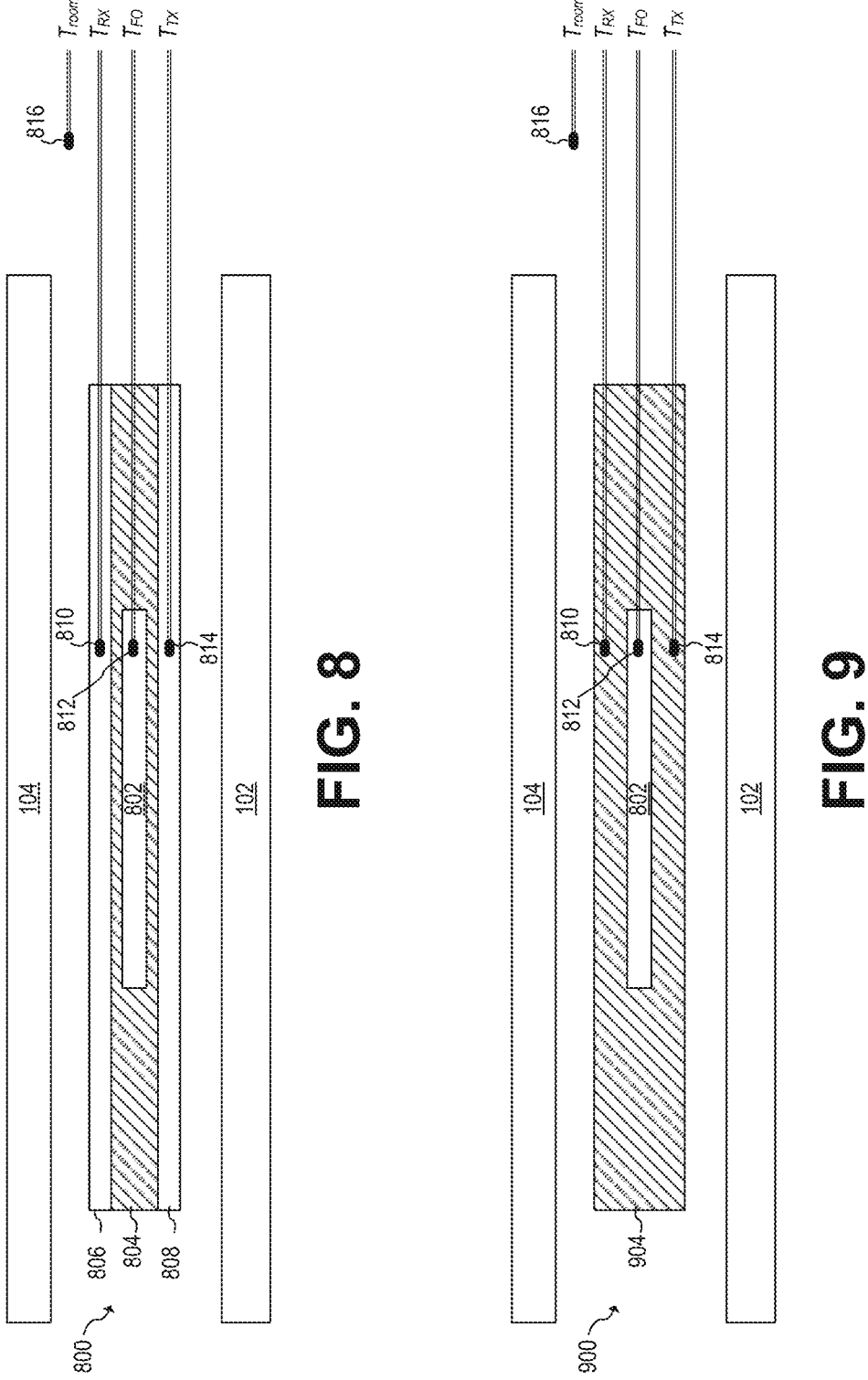
FIGS. 8-10 illustrate FOs, according to embodiments of the present invention.
Figures 10, 11:
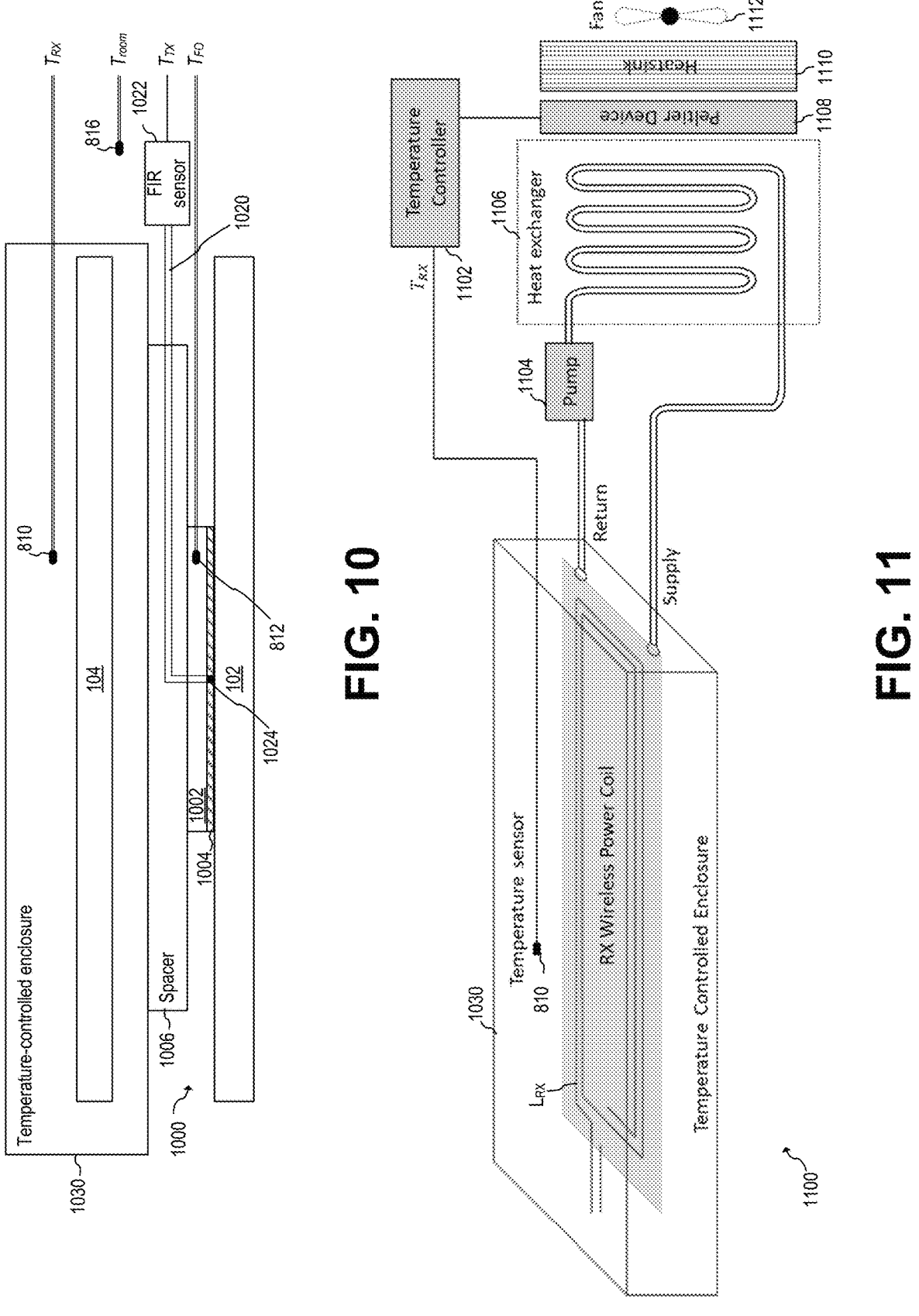
FIG. 11 illustrates a system for controlling the temperature of temperature-controlled enclosure 1030, according to an embodiment of the present invention.

In some embodiments, an FO device (e.g., as shown in FIG. 8-10) with known characteristics (e.g., characteristics predetermined empirically and/or via mathematical calculations) is used for performing FOD testing, thereby advantageously facilitating the FOD testing process.

Figure 1:
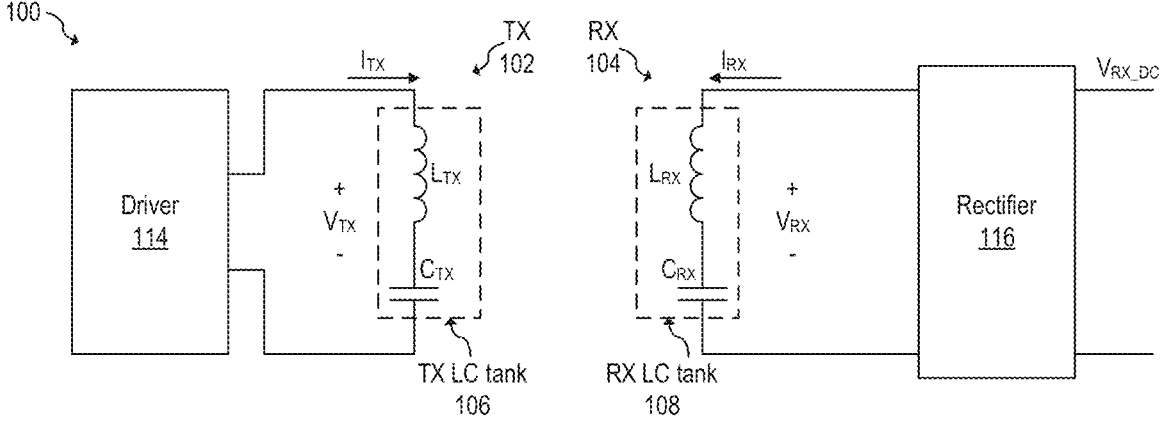
FIG. 1 shows a schematic diagram of an exemplary wireless charging system.
Figure 2A:
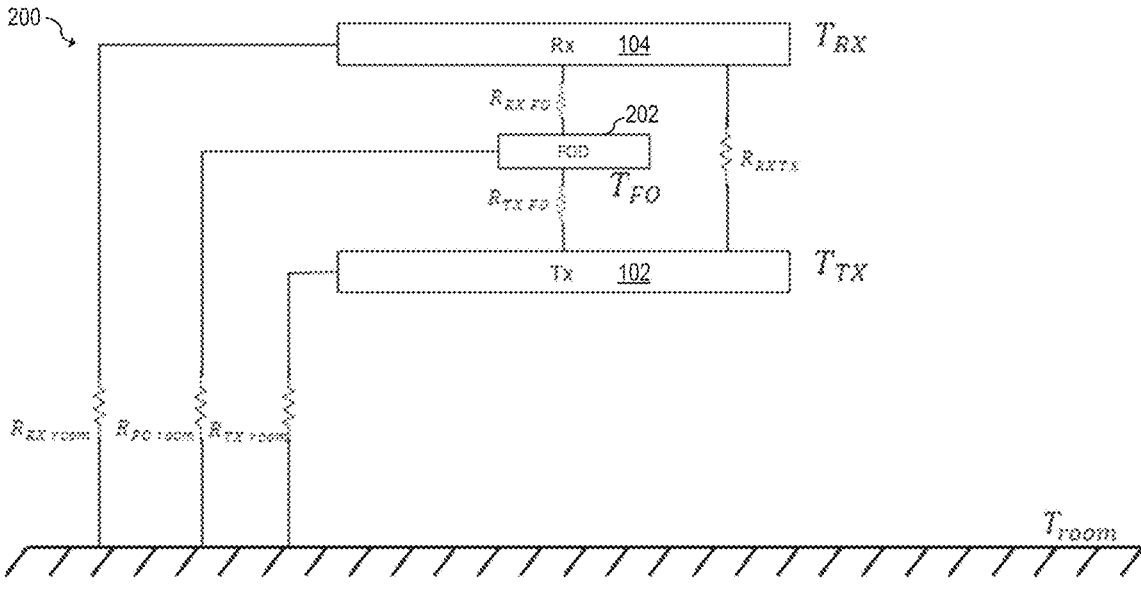
FIGS. 2A and 2B illustrate a thermal representation and an electrical representation, respectively, of a thermal model used to model thermal interactions between a wireless power transmitter, a wireless power receiver, and a FO, according to an embodiment of the present invention.
Figure 2B:
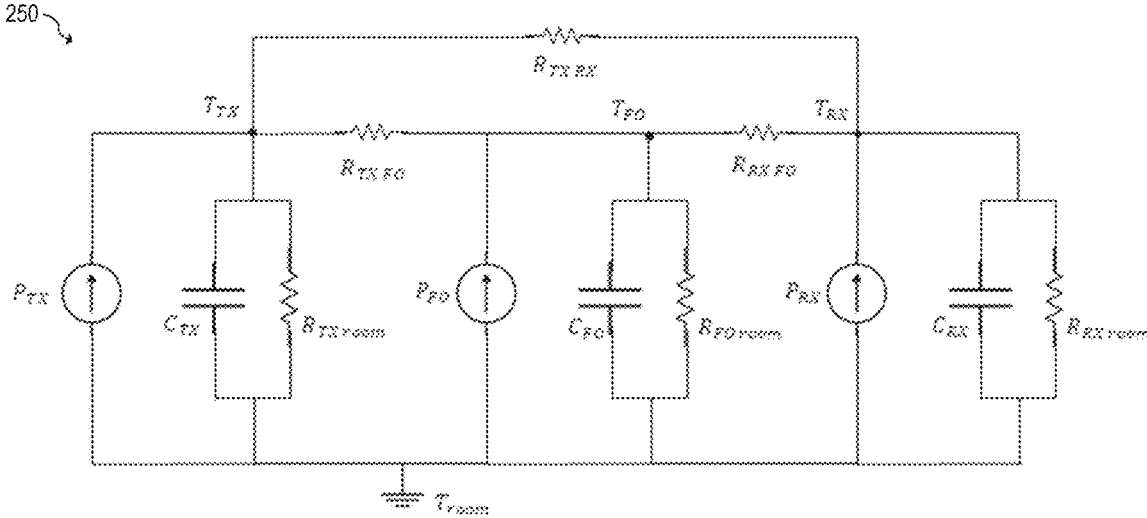

FIG. 2A illustrates a thermal representation of thermal model 200 used to model thermal interactions between wireless power transmitter 102, wireless power receiver 104, and FO 202, according to an embodiment of the present invention. FIG. 2B illustrates an electrical representation of thermal model 250 used to model thermal interactions between wireless power transmitter 102, wireless power receiver 104, and FO 202, according to an embodiment of the present invention.

In thermal models 200 and 250, $T_{RX}$ represents the temperature of receiver 104, $T_{TX}$ represents the temperature of transmitter 102, $T_{FO}$ represents the temperature of FO 202, $T_{room}$ represents the room temperature where transmitter 102, receiver 104 and FO 202 are located, $R_{RX\,FO}$ represents the thermal impedance between receiver 104 and FO 202, $R_{TX\,FO}$ represents the thermal impedance between transmitter 102 and FO 202, $R_{RX\,TX}$ represents the thermal impedance between receiver 104 and transmitter 102, $R_{RX\,room}$ represents the thermal impedance between receiver 104 and room temperature, $R_{TX\,room}$ represents the thermal impedance between transmitter 102 and room temperature, and $R_{FO\,room}$ represents the thermal impedance between FO 202 and room temperature, $C_{TX}$ represents the heat capacity of transmitter 102, $C_{RX}$ represents the heat capacity of receiver 104, CFO represents the heat capacity of FO 202, $P_{TX}$ represents power provided/received by transmitter 102, $P_{RX}$ represents power provided/received by receiver 104, and $P_{FO}$ represents power provided/received by FO 202.

As shown in FIG. 2A, thermal model 200 may include three states: $T_{RX}$, $T_{TX}$, and $T_{FO}$ ($T_{room}$ is considered constant and thus not considered a state).

As shown in FIG. 2B, power may be generated in the transmitter 102 (e.g., $P_{tx}$=2.25 W), the receiver 104 (e.g., $P_{RX}$=1.5 W), and FO 202 (e.g., $P_{FO}$=0.5 W when dissipating 0.5 W, or $P_{FO}$=0 W when no power is dissipated by FO 202).

As can be seen from FIGS. 2A and 2B, the temperature of the FO 202 depends on the temperature of transmitter 102, receiver 104, the thermal impedances between transmitter 102, receiver 104, FO 202, and ambient temperature (in addition to the amount of power dissipated by FO 202). Thus, absolute temperature of the FO may not be a good indicator for dissipated power into the FO.

Figure 3A:
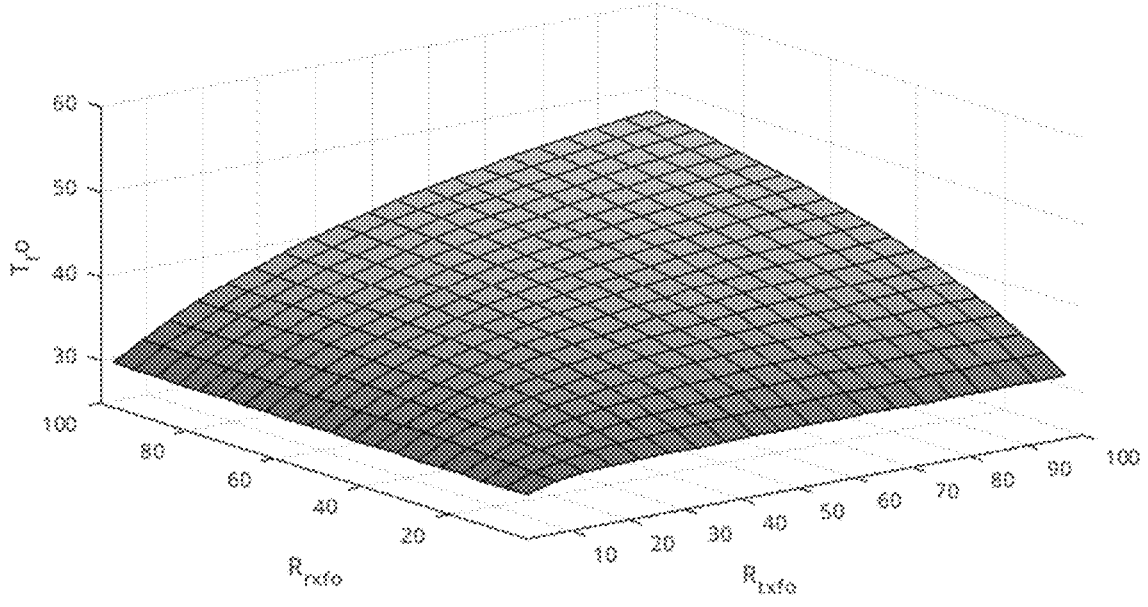
FIGS. 3A-3D show 3D plots illustrating how the temperature of an FO may vary under various conditions, according to an embodiment of the present invention.
Figure 3B:
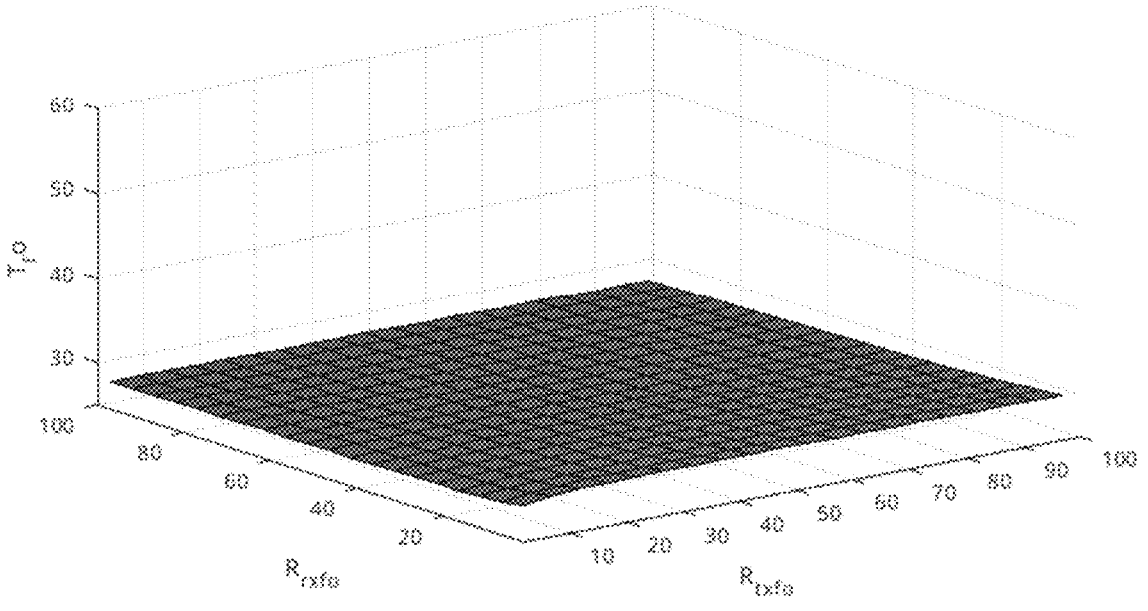
Figure 3C:
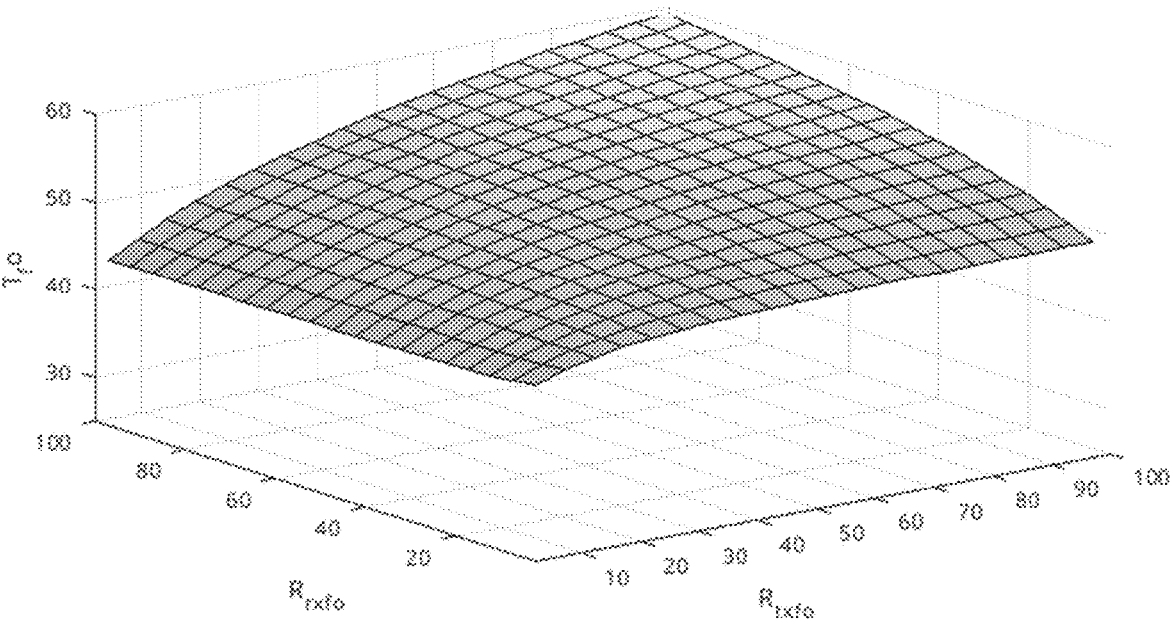
Figure 3D:
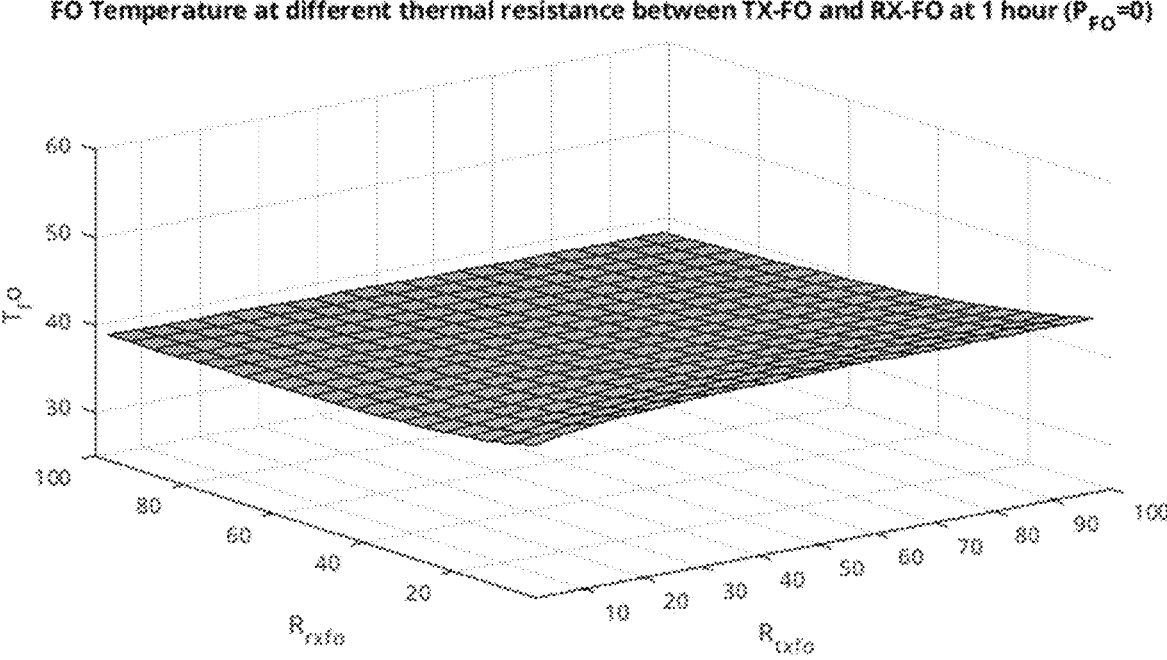

FIGS. 3A-3D show 3D plots illustrating how the temperature of FO 202 ($T_{FO}$) may vary with different thermal impedances between receiver 104 and FO 202 ($R_{RX\,FO}$) and different thermal impedances between transmitter 102 and FO 202 ($R_{TX\,FO}$) at different times, according to an embodiment of the present invention. FIG. 3A shows a 3D plot captured at the loth minute of FO 202 dissipating 0.5 W. FIG. 3B shows a 3D plot captured at the loth minute of FO 202 dissipating 0 W. FIG. 3C shows a 3D plot captured at 1 hour of FO 202 dissipating 0.5 W. FIG. 3D shows a 3D plot captured at 1 hour of FO 202 dissipating 0 W.

As can be seen by comparing FIGS. 3A and 3B (or comparing FIGS. 3C and 3D), the higher the thermal impedance, the easier it is to distinguish dissipated power at FO 202 based on the temperature of FO 202.

Figure 4:
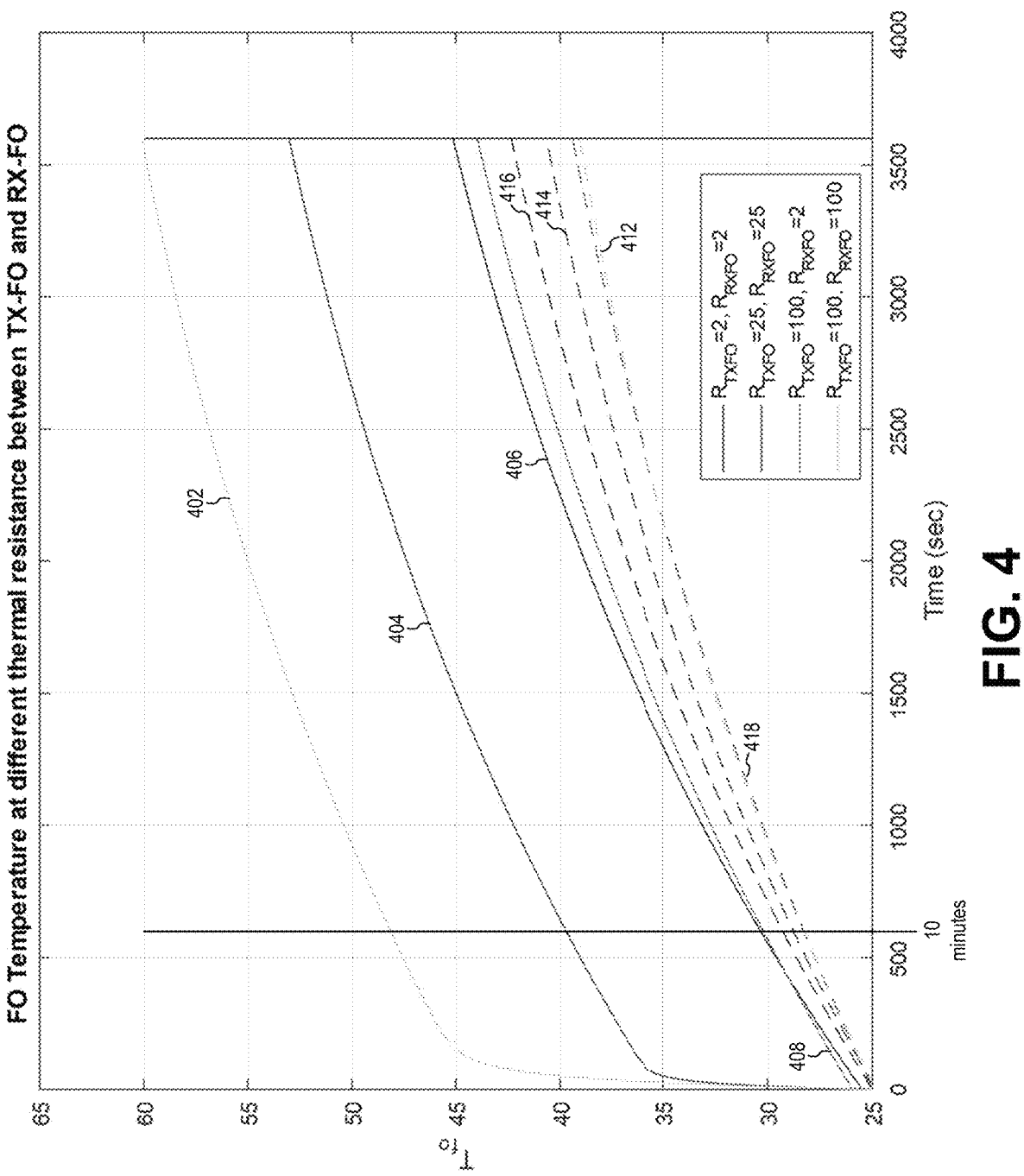
FIG. 4 show curves illustrating the temperature of an FO over time for various conditions, according to an embodiment of the present invention.

FIG. 4 show curves illustrating the temperature $T_{FO}$ of FO 202 over time for various conditions, according to an embodiment of the present invention. Curve 402 represents the temperature $T_{FO}$ when FO 202 is dissipating 0.5 W, the thermal impedance between transmitter 102 and FO 202 is $R_{TX\ FO}=100°$ C./W and the thermal impedance between receiver 104 and FO 202 is $R_{RX\ FO}=100°$ C./W. Curve 404 represents the temperature $T_{FO}$ when FO 202 is dissipating 0.5 W, the thermal impedance between transmitter 102 and FO 202 is $R_{TX\ FO}=25°$ C./W and the thermal impedance between receiver 104 and FO 202 is $R_{RX\ FO}=25°$ C./W. Curve 406 represents the temperature $T_{FO}$ when FO 202 is dissipating 0.5 W, the thermal impedance between transmitter 102 and FO 202 is $R_{TX\ FO}=2°$ C./W and the thermal impedance between receiver 104 and FO 202 is $R_{RX\ FO}=2°$ C./W. Curve 408 represents the temperature $T_{FO}$ when FO 202 is dissipating 0.5 W, the thermal impedance between transmitter 102 and FO 202 is $R_{TX\ FO}=100°$ C./W and the thermal impedance between receiver 104 and FO 202 is $R_{RX\ FO}=2°$ C./W. Curve 412 represents the temperature $T_{FO}$ when FO 202 is dissipating 0 W, the thermal impedance between transmitter 102 and FO 202 is $R_{TX\ FO}=100°$ C./W and the thermal impedance between receiver 104 and FO 202 is $R_{RX\ FO}=100°$ C./W. Curve 414 represents the temperature $T_{FO}$ when FO 202 is dissipating 0 W, the thermal impedance between transmitter 102 and FO 202 is $R_{TX\ FO}=25°$ C./W and the thermal impedance between receiver 104 and FO 202 is $R_{RX\ FO}=25°$ C./W. Curve 416 represents the temperature $T_{FO}$ when FO 202 is dissipating 0 W, the thermal impedance between transmitter 102 and FO 202 is $R_{TX\ FO}=2°$ C./W and the thermal impedance between receiver 104 and FO 202 is $R_{RX\ FO}=2°$ C./W. Curve 418 represents the temperature $T_{FO}$ when FO 202 is dissipating 0 W, the thermal impedance between transmitter 102 and FO 202 is $R_{TX\ FO}=100°$ C./W and the thermal impedance between receiver 104 and FO 202 is $R_{RX\ FO}=2°$ C./W.

As illustrated in FIG. 4, absolute temperature $T_{FO}$ of FO 202 may not be very useful as an indication of dissipated power by FO 202 since temperature $T_{FO}$ may not contain clear information (since $T_{FO}$ may be affected by the factors other than dissipated power, as illustrated by curves 412, 414, 416, and 418) and $T_{FO}$ may take a long time to settle.

The inventors realized that, although $T_{FO}$ alone may not be very useful as an indication of dissipated power by FO 202, the difference between $T_{FO}$ and the temperature that $T_{FO}$ would have had if no power is dissipated in FO 202 settles at about 10 minutes (as can be seen in FIG. 4) and provides a good indication of power dissipated by FO 202. As can also be seen in FIG. 4, the results after 1 hour may just follow the $P_{TX}/P_{RX}$ dynamics and may not offer any new information.

In some embodiments, a weighted average temperature is used as an approximation to the temperature $T_{FO}$ that FO 202 would have if no power is dissipated by FO 202 (e.g., to calculate curves 412, 414, 416, and 418, based on the temperatures $T_{TX}$, $T_{RX}$, and $T_{room}$). For example, in some embodiments, the weighted average temperature $T_{AVG}$ may be given by $$T_{AVG} = \frac{\frac{1}{R_{TXFO}}T_{TX} + \frac{1}{R_{RXFO}}T_{RX} + \frac{1}{R_{FOroom}}T_{room}}{\frac{1}{R_{TXFO}} + \frac{1}{R_{RXFO}} + \frac{1}{R_{FOroom}}} \qquad (1)$$

Since temperatures $T_{TX}$, $T_{Rx}$, and $T_{room}$ may vary over time, Equation 1 may be rewritten to capture the temporal dependency as $$T_{AVG}(t) = \frac{\frac{1}{R_{TXFO}}T_{TX}(t) + \frac{1}{R_{RXFO}}T_{RX}(t) + \frac{1}{R_{FOroom}}T_{room}(t)}{\frac{1}{R_{TXFO}} + \frac{1}{R_{RXFO}} + \frac{1}{R_{FOroom}}} \qquad (2)$$

Equation 2 assumes that thermal impedances between transmitter 102, receiver 104, FO 202, and the room are constant. For the sake of generality, Equation 2 may be generalized as $$T_{AVG}(t) = \frac{\frac{1}{R_{TXFO}(t)}T_{TX}(t) + \frac{1}{R_{RXFO}(t)}T_{RX}(t) + \frac{1}{R_{FOroom}(t)}T_{room}(t)}{\frac{1}{R_{TXFO}(t)} + \frac{1}{R_{RXFO}(t)} + \frac{1}{R_{FOroom}(t)}} \qquad (3)$$

Figure 5:
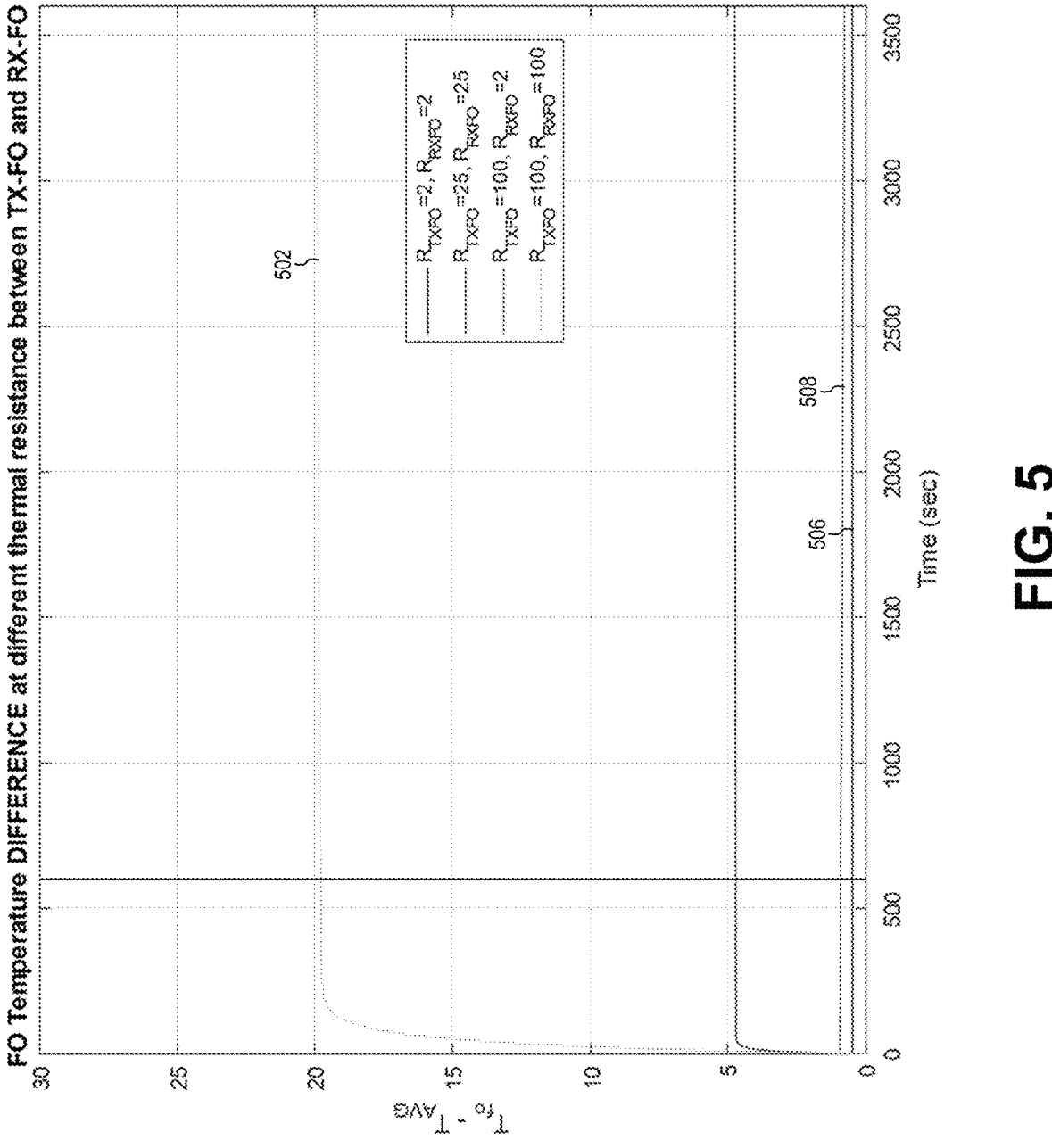
FIG. 5 shows a plot illustrating the difference between the temperature of an FO and the weighted average temperature of the thermal system over time for various conditions, according to an embodiment of the present invention.

FIG. 5 shows a plot illustrating the difference between the temperature of FO $T_{FO}$ and the weighted average temperature of the thermal system $T_{AVG}$ (as calculated using Equation 2) over time for various conditions, according to an embodiment of the present invention. Curve 502 represents $T_{FO}-T_{AVG}$ when FO 202 is dissipating 0.5 W, the thermal impedance between transmitter 102 and FO 202 is $R_{TX\ FO}=100°$ C./W and the thermal impedance between receiver 104 and FO 202 is $R_{RX\ FO}=100°$ C./W. Curve 504 represents $T_{FO}-T_{AVG}$ when FO 202 is dissipating 0.5 W, the thermal impedance between transmitter 102 and FO 202 is $R_{TX\ FO}=25°$ C./W and the thermal impedance between receiver 104 and FO 202 is $R_{RX\ FO}=25°$ C./W. Curve 506 represents $T_{FO}-T_{AVG}$ when FO 202 is dissipating 0.5 W, the thermal impedance between transmitter 102 and FO 202 is $R_{TX\ FO}=2°$ C./W and the thermal impedance between receiver 104 and FO 202 is $R_{RX\ FO}=2°$ C./W. Curve 508 represents $T_{FO}-T_{AVG}$ when FO 202 is dissipating 0.5 W, the thermal impedance between transmitter 102 and FO 202 is $R_{TX\ FO}=100°$ C./W and the thermal impedance between receiver 104 and FO 202 is $R_{RX\ FO}=2°$ C./W.

As shown in FIG. 5, good thermal coupling (e.g., as illustrated by curves 506 and 508) may provide little information about dissipated power level in FO. Average thermal coupling could be a good option. Low thermal coupling (e.g., as illustrated by curve 502) may have the highest sensitivity (good: precision, bad: difficult to implement).

As shown in FIG. 5, in some embodiments, the difference $T_{FO}-T_{AVG}$ settles at or before 10 minutes, and may be used as an indication for power dissipated by FO 202 with thermal impedances $R_{TX\ FO}$ (between transmitter 102 and FO 202) and $R_{RX\ FO}$ (between receiver 104 and FO 202) well below 100° C./W, such as 25° C./W or lower.

Figure 6A:
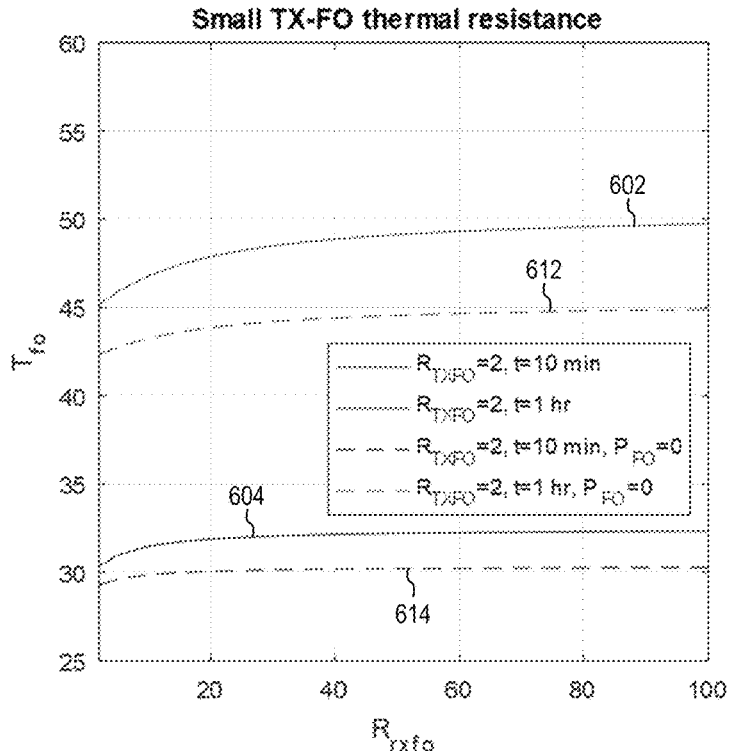
FIGS. 6A-6C show 2D plots illustrating how the temperature of an FO may vary with respect to the thermal impedance between a receiver and the FO at different times and for different values of thermal impedance between a transmitter and the FO), according to an embodiment of the present invention.
Figure 6B:
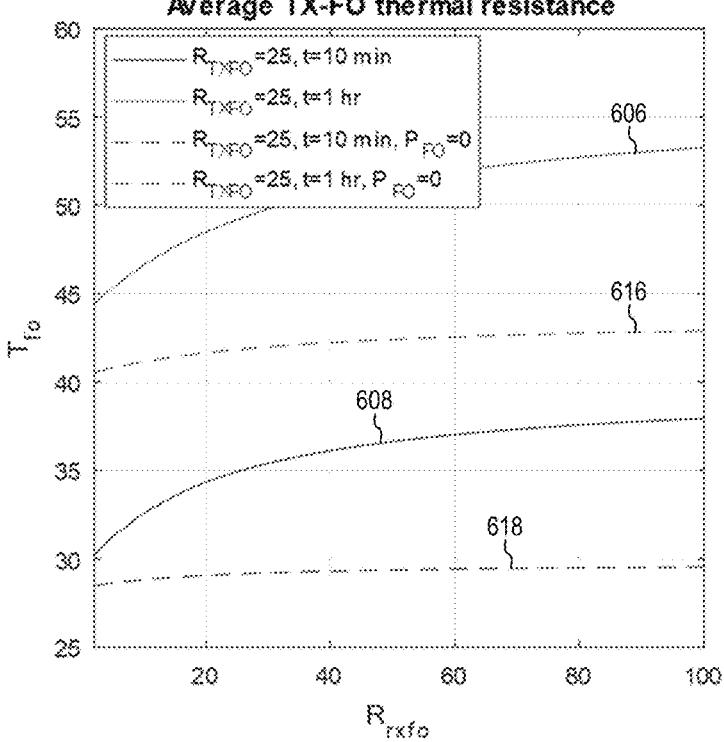
Figures 6C, 7:
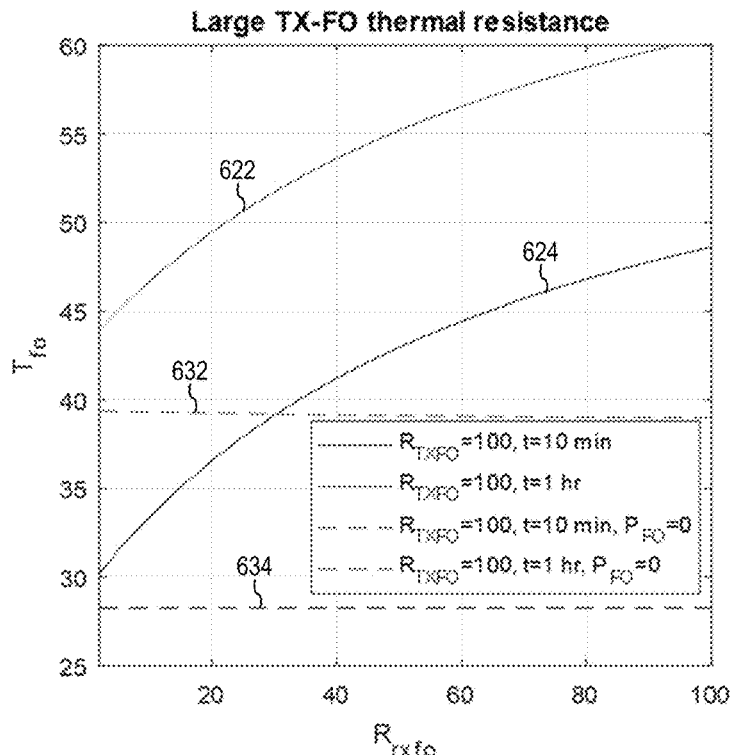
FIG. 7 shows a flow chart of an embodiment method for FOD testing, according to an embodiment of the present invention.

FIGS. 6A-6C show 2D plots illustrating how the temperature of FO 202 ($T_{FO}$) may vary with respect to $R_{RX\ FO}$ (thermal impedance between receiver 104 and FO 202) at different times and for different values of $R_{TX\ FO}$ (thermal impedance between transmitter 102 and FO 202), according to an embodiment of the present invention. The curves illustrated in FIGS. 4A and 4C represent 2D slices of the 3D plots shown in FIGS. 3A-3D at various conditions.

Curve 602 represents the temperature $T_{FO}$ with respect to $R_{RX\ FO}$ measured 10 minutes after the beginning of wireless power transmission of system 100, when FO 202 is dissipating 0.5 W, and $R_{TX\ FO}=2°$ C./W. Curve 612 represents the temperature $T_{FO}$ with respect to $R_{RX\ FO}$ measured 10 minutes after the beginning of wireless power transmission of system 100, when FO 202 is dissipating 0 W, and $R_{TX\ FO}$=2° C./W. Curve 604 represents the temperature $T_{FO}$ with respect to $R_{RX\ FO}$ measured 1 hour after the beginning of wireless power transmission of system 100, when FO 202 is dissipating 0.5 W, and $R_{TX\ FO}$=2° C./W. Curve 614 represents the temperature $T_{FO}$ with respect to $R_{RX\ FO}$ measured 1 hour after the beginning of wireless power transmission of system 100, when FO 202 is dissipating 0 W, and $R_{TX\ FO}$=2° C./W. Curve 606 represents the temperature $T_{FO}$ with respect to $R_{RX\ FO}$ measured 10 minutes after the beginning of wireless power transmission of system 100, when FO 202 is dissipating 0.5 W, and $R_{TX\ FO}$=25° C./W. Curve 616 represents the temperature $T_{FO}$ with respect to $R_{RX\ FO}$ measured 10 minutes after the beginning of wireless power transmission of system 100, when FO 202 is dissipating 0 W, and $R_{TX\ FO}$=25° C./W. Curve 608 represents the temperature $T_{FO}$ with respect to $R_{RX\ FO}$ measured 1 hour after the beginning of wireless power transmission of system 100, when FO 202 is dissipating 0.5 W, and $R_{TX\ FO}$=25° C./W. Curve 618 represents the temperature $T_{FO}$ with respect to $R_{RX\ FO}$ measured 1 hour after the beginning of wireless power transmission of system 100, when FO 202 is dissipating 0 W, and $R_{TX\ FO}$=25° C./W. Curve 622 represents the temperature $T_{FO}$ with respect to $R_{RX\ FO}$ measured 10 minutes after the beginning of wireless power transmission of system 100, when FO 202 is dissipating 0.5 W, and $R_{TX\ FO}$=100° C./W. Curve 632 represents the temperature $T_{FO}$ with respect to $R_{RX\ FO}$ measured 10 minutes after the beginning of wireless power transmission of system 100, when FO 202 is dissipating 0 W, and $R_{TX\ FO}$=100° C./W. Curve 624 represents the temperature $T_{FO}$ with respect to $R_{RX\ FO}$ measured 1 hour after the beginning of wireless power transmission of system 100, when FO 202 is dissipating 0.5 W, and $R_{TX\ FO}$=100° C./W. Curve 634 represents the temperature $T_{FO}$ with respect to $R_{RX\ FO}$ measured 1 hour after the beginning of wireless power transmission of system 100, when FO 202 is dissipating 0 W, and $R_{FO}$=100° C./W.

As shown by FIG. 6A-6C, the higher the thermal impedance, the easier it is to identify the amount of power dissipated when compared to $T_{AVG}$. For example, as shown in FIG. 6B, when $R_{TX\ FO}$=25° C./W, FO 202 dissipating 0.5 W is 5° C. or more higher than $T_{AVG}$ just 10 minutes after the beginning of wireless power transfer when $R_{RX\ FO}$>=20° C./W. Such difference between $T_{FO}$ and $T_{AVG}$ may be sufficient to identify the power dissipated by FO 202 to determine whether it is dissipating more than a predetermined amount of power, such as 0.5 W.

In some embodiments, the test setup for performing FOD testing measures the following: temperature of FO 202 ($T_{FO}$), temperature of transmitter 102 ($T_{TX}$), temperature of receiver 104 ($T_{RX}$) and room temperature of the room including system 100 ($T_{room}$). Some embodiments additionally measure or prescribe: $R_{TX\,FO}$, $R_{RX\,FO}$, $R_{FO\,room}$. In some embodiments, higher values for the thermal resistance values increase the precision of the measurement of dissipated power in FO 202.

FIG. 7 shows a flow chart of embodiment method 700 for FOD testing, according to an embodiment of the present invention.

During step 702, an FO (e.g., 202) is placed between transmitter 102 and receiver 104. In some embodiments, FO 202 includes a device (e.g., thermistor or thermocouple) capable of sensing the temperature of FO 202. In some embodiments, the transmitter 102, receiver 104, and FO 202 are all placed inside a chamber with controlled (e.g., $T_{room}$) temperature.

During step 704, wireless power transmitter 104 begins transferring power wirelessly towards wireless power receiver 104. In some embodiments, the amount of power transmitted by wireless power transmitter may be, e.g., 2.25 W. Higher power levels (e.g., 2.5 W, 5 W, or more), or lower power levels (e.g., 1.5 W, or lower) may also be transmitted by transmitter 104 during step 704.

During step 706, after a predetermined amount of time $t_{wait}$ since the beginning of wireless power transfer (during step 704), temperatures $T_{FO}$, $T_{TX}$, $T_{RX}$, and $T_{room}$ of transmitter 102, receiver 104, FO 202, and the room in which system 100 is located, respectively, are measured. During step 706, the weighted average temperature $T_{AVG}$ is determined (e.g., using Equation 1) based on the measured temperatures $T_{TX}$, $T_{RX}$, and $T_{room}$.

In some embodiments, the predetermined amount of time $t_{wait}$ may be, e.g., 10 minutes. In some embodiments, $t_{wait}$ may be higher than 10 minutes (e.g., 30 minutes, 1 hour, or more), or lower than 10 minutes (e.g., 8 minutes or lower).

If it is determined during step 708 that the difference between $T_{FO}$ and $T_{AVG}$ is higher than a predetermined temperature threshold $T_{thres}$, then, it is determined that FO 202 is dissipating more than a predetermined amount of power P thres, and the FOD implemented by transmitter 102 failed to properly prevent FO 202 from dissipating more than $P_{thres}$. Otherwise, if the difference between $T_{FO}$ and $T_{AVG}$ is lower than $T_{thres}$, then it is determined that the FOD implemented by transmitter 102 is operating properly and properly prevented FO 202 from dissipating more than $P_{thres}$.

In some embodiments, when step 708 outputs "yes," an error flag indicative of a failed test is asserted. In some embodiments, asserting the error flag comprises making a sound, displaying an image or text in a display, turning on a (e.g., red) light, etc.

In some embodiments, when step 708 outputs "no," a passing flag indicative of a passed test is asserted. In some embodiments, asserting the passing flag comprises making a sound, displaying an image or text in a display, turning on a (e.g., green) light, etc.

In some embodiments, $T_{thres}$ is determined such that it corresponds to FO 202 dissipating $P_{thres}$ for the particular $t_{wait}$, $R_{RX\,FO}$, $R_{TX\,FO}$, and $R_{FO\,room}$ used when performing method 700. In some embodiments, $T_{thres}$ may be determined empirically (e.g., based on a curve similar to the curves in FIG. 5 and captured for the particular setup and conditions). In some embodiments, $T_{thres}$ may be determined mathematically.

FIG. 8 illustrates FO device 800, according to an embodiment of the present invention. FO 800 may be used during method 700 as the FO placed between transmitter 102 and receiver 104 during step 702.

FO device 800 includes metallic object 802 (also referred to as FO 802), thermal conductors (which are also electrical insulators) 806 and 808, thermal insulator (which is also electrical insulator) 804, and temperature sensors 810, 812, and 814.

As shown in FIG. 8, thermal conductors 806 and 808 (which may be respectively in contact with receiver 104 and transmitter 102), include temperature sensors 810 and 814, respectively. Since thermal conductors 806 and 808 decreases the thermal impedance to transmitter 104 and receiver 102, respectively, the temperature measured by at the thermal conductors 806 and 808 by temperature sensors

810 and 814 approximates temperatures $T_{RX}$ and $T_{TX}$, respectively. Thermal insulator 804 is used to increase the thermal impedance between thermal conductors 806 and 808, and FO 802. For example, in some embodiments, the properties of thermal insulator 804 (e.g., material and dimensions) causes the thermal impedance between FO 802 and thermal conductor 806 and FO 802 and thermal conductor 808 to be above a predetermined threshold, such as higher than 25° C./W.

In some embodiments, FO 802 may be implemented with a metal capable of producing Eddy currents (and heating up) in response to a magnetic field. Examples of such metals include aluminum, iron, steel, etc. In some embodiments, FO 802 may have the shape of a disc (e.g., having 0.25 mm of height, and a diameter smaller than the diameter of receiving coil $L_{RX}$). Other implementations are also possible.

In some embodiments, thermal insulator 804 may fully surround FO 802 from all sides. In some embodiments, the distance between FO 802 and thermal conductors 806 and 808 may be 0.25 mm. Other implementations are also possible.

In some embodiments, to prevent thermal conductors 806 and 808 from heating up as a result of a magnetic field, thermal conductors 806 and 808 may be implemented with electrical insulator materials, such as Beryllium Oxide ceramic may be the best choice: thermal conductivity similar to aluminum; other choices are thermally conductive plastics with low electrical conductivity or electrical insulators. In some embodiments, thermal conductors 806 and 808 may be implemented with plates as thin as 0.25 mm (or thinner). Other implementations, such as thicker plates, are also possible.

Temperature sensors 810, 812, and 814 may be implemented in a conventional manner. For example, in some embodiments, temperature sensors 810, 812, and 814 are implemented with a respective thermocouple, thermistor, or thermal resistor in contact with the respective surface to be sensed.

As a non-limiting example, when performing method 700 with FO device 800, temperatures $T_{room}$, $T_{RX}$, $T_{FO}$, and $T_{TX}$ may be measured with temperature sensors 816, 810, 812, and 814, respectively, where temperature sensor 816 may be implemented in a conventional manner, such as with a conventional ambient temperature sensor. The weighted average temperature $T_{AVG}$ used during step 708 may be determined (e.g., during step 706) by $$T_{AVG} = \frac{\frac{1}{R_1}T_1 + \frac{1}{R_2}T_2 \frac{1}{R_{FOroom}}T_{room}}{\frac{1}{R_1} + \frac{1}{R_2} + \frac{1}{R_{FOroom}}} \quad (4)$$

Equation 4 is analogous to Equation 1, where $T_1$ represents the temperature measured by temperature sensor 810, T2 represents the temperature measured by temperature sensor 814, $T_{room}$ represents the temperature measured by temperature sensor 816, $R_1$ represents the thermal impedance between thermal conductor 806 and FO 802, $R_2$ represents the thermal impedance between thermal conductor 808 and FO 802, and $R_{FO\ room}$ represents the thermal impedance between FO 802 and the room.

In some embodiments, the FO device may be implemented without thermal conductors 806 and 808. For example, FIG. 9 illustrates FO device 900, according to an embodiment of the present invention. FO device 900 is similar to FO 800, operates in a similar manner as FO device 800, and may be used during method 700 in a similar manner as FO 800. FO device 900, however, does not include thermal conductors 806 and 808. As a result, temperature sensors 810 and 814 are located in thermal insulator 904, $R_1$ represents the thermal impedance between temperature sensor 810 and FO 802, and $R_2$ represents the thermal impedance between temperature sensor 814 and FO 802.

In some embodiments, thermal insulator 904 is in contact with transmitter 102 and receiver 104.

FIG. 10 illustrates FO device 1000, according to an embodiment of the present invention. FO 1000 may be used during method 700 as the FO placed between transmitter 102 and receiver 104 during step 702.

FO 1000 includes spacer 1006, thermal insulator 1004, FO 1002, and temperature sensing material 1024.

FO 1002 is similar and operates in a similar manner as FO 802. FO 1002, however, includes a hole to allow optic fiber 1020 through. In some embodiments, optic fiber 1020 (which is transparent to far IR) may be used to allow far infra-red (FIR) sensor 1022 (e.g., which may be external to FO device 1000) to sense the temperature of transmitter 102 by sensing the temperature of sensing material 1024.

As shown in FIG. 10, spacer 1006 includes a hole to allow optical fiber 1020 through. In some embodiments, spacer 1006 may be implemented with an electrical insulator material that is also a thermal insulator material.

As shown in FIG. 10, in some embodiments, temperature-controlled enclosure 1030 may fully enclose receiver 104 may be used to keep receiver 104 at a controlled temperature (e.g., equal to room temperature, such that $T_{RX}=T_{room}$). In some embodiments, using temperature-controlled enclosure 1030 is feasible since receiver 104 may be part of a test equipment used to test the FOD of transmitter 102, and, thus, may not be restricted in size and other limitations.

In some embodiments, temperature-controlled enclosure 1030 is implemented as a liquid cooled/heater enclosure. Other implementations are also possible.

In some embodiments, thermal insulator 1004 may include similar properties (e.g., similar material) as thermal insulator 804 and 904.

In some embodiments, temperature sensing material 1024 is implemented with phosphorous, semiconductors, or crystals, which may advantageously improve the temperature sensing accuracy of FIR sensor 1022. In some embodiments, temperature sensing material 1024 may be omitted.

FIG. 11 illustrates system 1100 for controlling the temperature of temperature-controlled enclosure 1030, according to an embodiment of the present invention. System 1100 may be used for controlling the temperature of receiver 104 during the performance of method 700.

System 1100 includes enclosure 1030 (which includes receiver 104) and temperature sensor 810, temperature controller 1102, pump 1104, heat exchanger 1106, Peltier device 1108, heatsink 1110, and fan 1112.

As shown in FIG. 11, pump 1104 circulates fluid through enclosure 1030 and heat exchanger 1106 to transfer heat between enclosure 1030 and Peltier device 1108. Temperature controller 1102 controls the voltage applied to Peltier device 1108 to control the temperature of Peltier device 1108 such that temperature $T_{RX}$ is regulated to a predetermined temperature, such as $T_{room}$. Heatsink 1110 and fan 1112 allows Peltier device 1108 to dissipate heat faster to improve the response time of the thermal regulation of system 1100.

Temperature controller 1102 may be implemented in a conventional manner, such as including a PID controller, for example. Pump 1104, heat exchanger 1106, Peltier device 1108, heatsink 1110 and fan 1112 may be implemented in any way known in the art.

Figure 12:
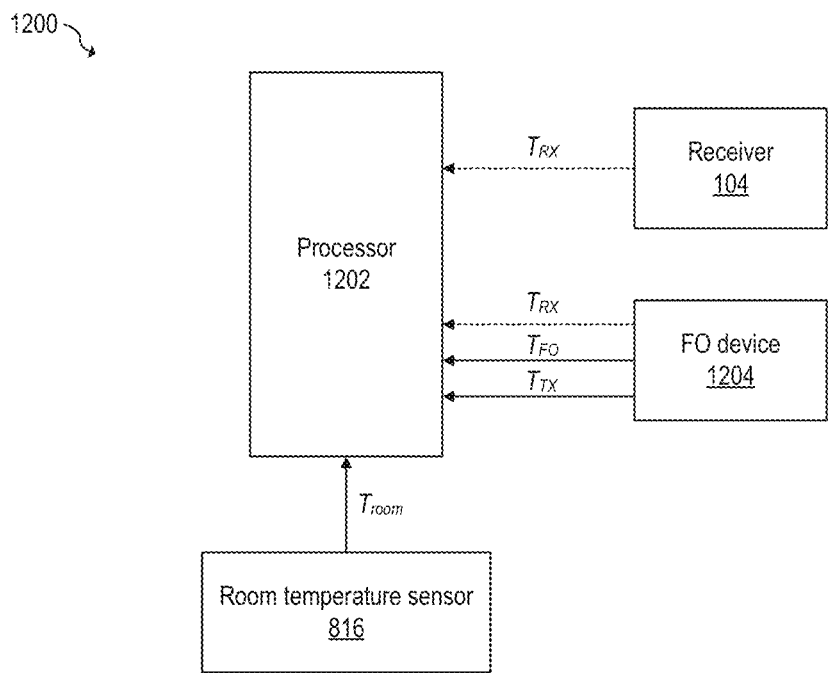
FIG. 12 illustrates a system for performing FOD testing, according to an embodiment of the present invention.

FIG. 12 illustrates system 1200 for performing FOD testing (e.g., for performing method 700), according to an embodiment of the present invention. System 1200 includes processor 1202, temperature sensor 816, FO device 1204, and wireless power receiver 104.

In some embodiments, FO device 1204 may be implemented as FO device 800, 900, 1000.

In some embodiments, wireless power receiver 104 may be enclosed in temperature-controlled enclosure 1030 (which may be liquid-cooled using system 1100).

In some embodiments, processor 1202 may be implemented by a generic or custom (e.g., general purpose) processor or controller (e.g., coupled to a memory and configured to execute instructions stored in such memory). Other implementations are also possible.

As a non-limited example, in some embodiments, a user performs steps 702 and 704. After a predetermined amount of time, the user causes processor 1202 to perform step 706 and 708 (e.g., by using an interface mechanism, such as pressing a button). In some embodiments, processor 1202 performs step 706 by triggering, in a known manner, the measurement of temperature by sensors 810, 812, 814, and 816, receiving the measured temperatures, then calculating $T_{AVG}$ (e.g., using Equation 1).

As another non-limiting example, in some embodiments, a user performs steps 702 and 704 and causes processor 1202 to start a timer. Upon expiration of the timer, processor 1202 automatically performs steps 706 and 708.

As yet another example, in some embodiments, a user performs step 702 and causes processor 1202 to cause the performance of step 704 (e.g., by triggering the beginning of wireless power transmission, e.g., via an electrical connection). Processor 1202 then automatically starts a timer and automatically performs steps 706 and 708.

Example embodiments of the present invention are summarized here. Other embodiments can also be understood from the entirety of the specification and the claims filed herein.

Example 1. A method for performing foreign object detection (FOD) testing of a wireless power transmitter, the method including: placing a foreign object (FO) between the wireless power transmitter and a wireless power receiver; beginning to wirelessly transmitting power from the wireless power transmitter towards the wireless power receiver; a predetermined amount of time after beginning to wirelessly transmit power, measuring an FO temperature indicative of a temperature of the FO, a transmitter temperature indicative of a temperature of the wireless power transmitter, and a receiver temperature indicative of a temperature of the wireless power receiver; determining a weighted average temperature based on the measured transmitter temperature and the measured receiver temperature; and when a difference between the measured FO temperature and the weighted average temperature is higher than a threshold temperature, asserting an error flag indicative that the FOD test failed.

Example 2. The method of example 1, the method further including, measuring an ambient temperature, where measuring the transmitter temperature includes measuring the transmitter temperature at a first location, where measuring the receiver temperature includes measuring the receiver temperature at a second location, where determining the weighted average temperature includes determining the weighted average temperature by $$T_{AVG} = \frac{\frac{1}{R_{TXFO}}T_{TX} + \frac{1}{R_{RXFO}}T_{RX} + \frac{1}{R_{FOroom}}T_{room}}{\frac{1}{R_{TXFO}} + \frac{1}{R_{RXFO}} + \frac{1}{R_{FOroom}}},$$

where $R_{TX\,FO}$ represents a thermal impedance between the FO and the first location, where $R_{RX\,FO}$ represents a thermal impedance between the FO and the second location, where $R_{FO\,room}$ represents a thermal impedance between the FO and the ambient temperature, $T_{TX}$ represents the measured transmitter temperature, $T_{RX}$ represents the measured receiver temperature, and $T_{room}$ represents the measured ambient temperature.

Example 3. The method of one of examples 1 or 2, where the first location is a location of a thermal insulator between the FO and the wireless power transmitter, and where the second location is a location of the thermal insulator between the FO and the wireless power receiver.

Example 4. The method of one of examples 1 to 3, where the first location is a location of a first thermally conducting plate disposed between the FO and the wireless power transmitter, and where the second location is a location of a second thermally conducting plate disposed between the FO and the wireless power receiver.

Example 5. The method of one of examples 1 to 4, where the first and second thermally conducting plates includes beryllium oxide ceramic.

Example 6. The method of one of examples 1 to 5, where the second location is a location inside an enclosure that include the wireless power receiver.

Example 7. The method of one of examples 1 to 6, where measuring the transmitter temperature includes measuring the transmitter temperature using a far infra-red (FIR) sensor that is coupled to the wireless power transmitter via an optic fiber.

Example 8. The method of one of examples 1 to 7, where the optic fiber is coupled to the wireless power transmitter via a temperature sensing material.

Example 9. The method of one of examples 1 to 8, where the temperature sensing material includes phosphorous, semiconductors, or crystals.

Example 10. The method of one of examples 1 to 9, where the optic fiber goes through a spacer that is disposed between the FO and the wireless power receiver.

Example 11. The method of one of examples 1 to 10, where the wireless power receiver is disposed inside a temperature-controlled enclosure.

Example 12. The method of one of examples 1 to 11, further including regulating a temperature of the temperature-controlled enclosure using liquid cooling.

Example 13. The method of one of examples 1 to 12, where the predetermined amount of time is lower than or equal to 1 hour.

Example 14. The method of one of examples 1 to 13, where the predetermined amount of time is lower than or equal to 10 minutes.

Example 15. The method of one of examples 1 to 14, where the threshold temperature corresponds to a predetermined amount of power dissipated by the FO, and where the predetermined amount of power dissipated by the FO is 0.5 W.

Example 16. A system for performing foreign object detection (FOD) testing of a wireless power transmitter, the system including: a wireless power receiver; a foreign object (FO) device including an FO; and a processor configured to, receive an FO temperature indicative of a temperature of the FO, a transmitter temperature indicative of a temperature of the wireless power transmitter, and a receiver temperature indicative of a temperature of the wireless power receiver, determine a weighted average temperature based on the received transmitter temperature and the received receiver temperature, and when a difference between the received FO temperature and the weighted average temperature is higher than a threshold, asserting an error flag indicative that the FOD test failed.

Example 17. The system of example 16, where the FO device includes a thermal insulator surrounding the FO.

Example 18. The system of one of examples 16 or 17, where the FO device includes first and second temperature sensors disposed in the thermal insulator on opposite sides of the FO, the first and second temperature sensors configured to sense the transmitter and receiver temperatures, respectively.

Example 19. The system of one of examples 16 to 18, where the FO device includes a first thermally conducting plate disposed at a first surface of the thermal insulator, and a second thermally conducting plate disposed at a second surface of the thermal insulator, the first surface of the thermal insulator being opposite to the second surface of the thermal insulator.

Example 20. The system of one of examples 16 to 19, where the FO device includes first and second temperature sensors disposed in the first and second thermally conducting plates, respectively, the first and second temperature sensors configured to sense the transmitter and receiver temperatures, respectively.

Example 21. The system of one of examples 16 to 20, where the FO device includes a spacer disposed at a first surface of the FO, and a thermal insulator disposed at a second surface of the thermal insulator, the first surface of the thermal insulator being opposite to the second surface of the thermal insulator.

Example 22. The system of one of examples 16 to 21, where the FO devices includes an optic fiber that is disposed inside the spacer and extends through the FO from the first surface to the second surface.

Example 23. The system of one of examples 16 to 22, further including a thermally-controlled enclosure including the wireless power receiver.

Example 24. The system of one of examples 16 to 23, where the thermally-controlled enclosure is configured to be liquid-cooled.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for performing foreign object detection (FOD) testing of a wireless power transmitter, the method comprising:

placing a foreign object (FO) between the wireless power transmitter and a wireless power receiver;

beginning to wirelessly transmitting power from the wireless power transmitter towards the wireless power receiver;

a predetermined amount of time after beginning to wirelessly transmit power, measuring an FO temperature indicative of a temperature of the FO, a transmitter temperature indicative of a temperature of the wireless power transmitter, and a receiver temperature indicative of a temperature of the wireless power receiver;

determining a weighted average temperature based on the measured transmitter temperature and the measured receiver temperature; and when a difference between the measured FO temperature and the weighted average temperature is higher than a threshold temperature, asserting an error flag indicative that the FOD test failed, wherein measuring the transmitter temperature comprises measuring the transmitter temperature using a far infrared (FIR) sensor that is coupled to the wireless power transmitter via an optic fiber.

2. The method of claim 1, wherein the optic fiber is coupled to the wireless power transmitter via a temperature sensing material.

3. The method of claim 2, wherein the temperature sensing material comprises phosphorous, semiconductors, or crystals.

4. The method of claim 1, wherein the optic fiber goes through a spacer that is disposed between the FO and the wireless power receiver.

5. The method of claim 1, wherein the wireless power receiver is disposed inside a temperature-controlled enclosure.

6. The method of claim 5, further comprising regulating a temperature of the temperature-controlled enclosure using liquid cooling.

7. The method of claim 1, wherein the predetermined amount of time is lower than or equal to 1 hour.

8. The method of claim 7, wherein the predetermined amount of time is lower than or equal to 10 minutes.

9. The method of claim 1, wherein the threshold temperature corresponds to a predetermined amount of power dissipated by the FO, and wherein the predetermined amount of power dissipated by the FO is 0.5 W.

10. A system for performing foreign object detection (FOD) testing of a wireless power transmitter, the system comprising:

a wireless power receiver;

a foreign object (FO) device comprising an FO; and a processor configured to receive an FO temperature indicative of a temperature of the FO, a transmitter temperature indicative of a temperature of the wireless power transmitter, and a receiver temperature indicative of a temperature of the wireless power receiver, determine a weighted average temperature based on the received transmitter temperature and the received receiver temperature, and when a difference between the received FO temperature and the weighted average temperature is higher than a threshold, asserting an error flag indicative that the FOD test failed, wherein the FO device comprises a spacer disposed at a first surface of the FO and a thermal insulator disposed at a second surface of the thermal insulator, the first surface of the thermal insulator being opposite to the second surface of the thermal insulator.

11. The system of claim 10, wherein the FO device comprises a thermal insulator surrounding the FO.

12. The system of claim 11, wherein the FO device comprises first and second temperature sensors disposed in the thermal insulator on opposite sides of the FO, the first and second temperature sensors configured to sense the transmitter and receiver temperatures, respectively.

13. The system of claim 11, wherein the FO device comprises a first thermally conducting plate disposed at a first surface of the thermal insulator, and a second thermally conducting plate disposed at a second surface of the thermal insulator, the first surface of the thermal insulator being opposite to the second surface of the thermal insulator.

14. The system of claim 13, wherein the FO device comprises first and second temperature sensors disposed in the first and second thermally conducting plates, respectively, the first and second temperature sensors configured to sense the transmitter and receiver temperatures, respectively.

15. The system of claim 10, wherein the FO devices comprises an optic fiber that is disposed inside the spacer and extends through the FO from the first surface to the second surface.

16. The system of claim 10, further comprising a thermally-controlled enclosure comprising the wireless power receiver.

17. The system of claim 16, wherein the thermally-controlled enclosure is configured to be liquid-cooled.

18. A method for performing foreign object detection (FOD) testing of a wireless power transmitter, the method comprising:

placing a foreign object (FO) between the wireless power transmitter and a wireless power receiver;

beginning to wirelessly transmitting power from the wireless power transmitter towards the wireless power receiver;

a predetermined amount of time after beginning to wirelessly transmit power, measuring an FO temperature indicative of a temperature of the FO, a transmitter temperature indicative of a temperature of the wireless power transmitter, and a receiver temperature indicative of a temperature of the wireless power receiver;

measuring an ambient temperature, wherein measuring the transmitter temperature comprises measuring the transmitter temperature at a first location, wherein measuring the receiver temperature comprises measuring the receiver temperature at a second location;

determining a weighted average temperature, wherein determining the weighted average temperature comprises determining the weighted average temperature by $$T_{AVG} = \frac{\frac{1}{R_{TXFO}}T_{TX} + \frac{1}{R_{RXFO}}T_{RX} + \frac{1}{R_{FOroom}}T_{room}}{\frac{1}{R_{TXFO}} + \frac{1}{R_{RXFO}} + \frac{1}{R_{FOroom}}},$$

wherein $R_{TX\ FO}$ represents a thermal impedance between the FO and the first location, wherein $R_{RX\ FO}$ represents a thermal impedance between the FO and the second location, wherein $R_{FO\ room}$ represents a thermal impedance between the FO and the ambient temperature, $T_{TX}$ represents the measured transmitter temperature, $T_{RX}$ represents the measured receiver temperature, and $T_{room}$ represents the measured ambient temperature; and when a difference between the measured FO temperature and the weighted average temperature is higher than a threshold temperature, asserting an error flag indicative that the FOD test failed.

19. The method of claim 18, wherein the first location is a location of a thermal insulator between the FO and the wireless power transmitter, and wherein the second location is a location of the thermal insulator between the FO and the wireless power receiver.

20. The method of claim 18, wherein the first location is a location of a first thermally conducting plate disposed between the FO and the wireless power transmitter, and wherein the second location is a location of a second thermally conducting plate disposed between the FO and the wireless power receiver.

21. The method of claim 20, wherein the first and second thermally conducting plates comprises beryllium oxide ceramic.

22. The method of claim 18, wherein the second location is a location inside an enclosure that include the wireless power receiver.

* * * * *